United States Patent [19]

Foley et al.

[11] Patent Number: 5,363,924
[45] Date of Patent: Nov. 15, 1994

[54] WEIGHT TRANSFER SYSTEM FOR AN AGRICULTURAL MACHINE

[75] Inventors: Daniel M. Foley, Geneseo, Ill.; Michael D. Snyder, Bettendorf, Iowa

[73] Assignee: Deere & Company, Moline, Ill.

[21] Appl. No.: 38,316

[22] Filed: Mar. 29, 1993

[51] Int. Cl.⁵ ............................. A01B 59/042
[52] U.S. Cl. ................... 172/326; 172/677; 280/405.1
[58] Field of Search ............... 172/677, 262.5, 261, 172/324–326, 605; 280/405.1, 406.1

[56] References Cited

U.S. PATENT DOCUMENTS

| | | |
|---|---|---|
| 3,463,510 | 8/1969 | Van Syoc . |
| 4,588,201 | 5/1986 | Mohrbacker ............... 280/405.1 |
| 5,261,497 | 11/1993 | Snyder et al. ............... 172/313 |
| 5,265,898 | 11/1993 | Houck ............... 172/313 |

FOREIGN PATENT DOCUMENTS 0049637 10/1981 European Pat. Off. .

OTHER PUBLICATIONS

Erskin Manufacturing Company Inc. brochure entitled "Two Drill System Custom Engineered for the John Deere 750 No-Till Drills" published in U.S.A.

*Primary Examiner*—Randolph A. Reese
*Assistant Examiner*—Spencer Warnick

[57] ABSTRACT

A pair of grain drills are positional for side by side operation in the field and connected to a towing tractor by weight transfer hitch having a rear end portion connected to the grain drills and a forward tongue portion having its front end connectable to the tractor drawbar and its rearward end totally connected to the forward end of the rear hitch portion for swinging about a transverse horizontal pivot. A hydraulic cylinder has its ends respectively connected to the tongue and the rear hitch portion and pressure to the cylinder is controlled by an adjustable pressure control valve that delivers pressurized fluid from the tractor hydraulic system to the cylinder at a pre-selected pressure below the tractor system pressure, whereby the force exerted by the cylinder on the tongue transfers a portion of the weight of the machine to the tractor drawbar.

8 Claims, 2 Drawing Sheets

WEIGHT TRANSFER SYSTEM FOR AN AGRICULTURAL MACHINE

BACKGROUND OF THE INVENTION

1. Field of the Invention

This invention relates to a weight transfer hitch for transferring weight from a towed implement to a tractor drawbar and more specifically to a weight transfer hitch having particular utility for towing a pair of side by side seeding machines, such as grain drills.

2. Description of the Prior Art

U.S. patent application Ser. No. 07/876,238, now U.S. Pat. No. 5,261,497 also assigned to the assignee herein, discloses a hitch for connecting a pair of grain drills that are operated side by side and towed by a tractor during the seeding operation, the hitch including a mechanism whereby the grain drills can be towed in line one behind the other during transport of the machines.

Weight transfer hitches for connecting a towed implement to a tractor are broadly known, such hitches having some means of transferring some of the weight of the towed implement to the tractor, which increases the traction of the tractor while removing some of the weight that needs to be supported on the implement wheels. It is also known to use a hydraulic cylinder actuated by pressure from the tractor hydraulic system to accomplish the weight transfer.

SUMMARY OF THE INVENTION

According to the present invention an improved weight transfer hitch is provided that has particular utility in a hitch for attaching a plurality of side by side seeding units to a towing tractor.

An important feature of the invention resides in the use of a hydraulic cylinder to accomplish the weight transfer function utilizing the hydraulic pressure from the tractor hydraulic system, but utilizing only a preselected amount of said hydraulic pressure less than the standby pressure of the tractor hydraulic system.

Another feature of the invention resides in the use of an adjustable pressure control valve in the control system for the weight transfer cylinder, so that the amount of weight transferred to the tractor drawbar is constant during operation, although that pressure can be selectively adjusted to match the amount of weight transferred to the field conditions.

Another feature of the invention resides in the provision of a control system for a weight transfer system wherein the weight transfer is not affected by the relative position of the tractor drawbar to the implement, which can vary when the machines are being operated over uneven terrain.

An important advantage of the weight transfer system is the elimination of excessive and uneven loads on the frame of the towed machines, as well as transferring weight to the tractor drawbar to improve the traction of the tractor, which can be important when pulling a heavy load, such as multiple grain drill units, in poor traction conditions.

DESCRIPTION OF THE PREFERRED EMBODIMENT

Figure 1:
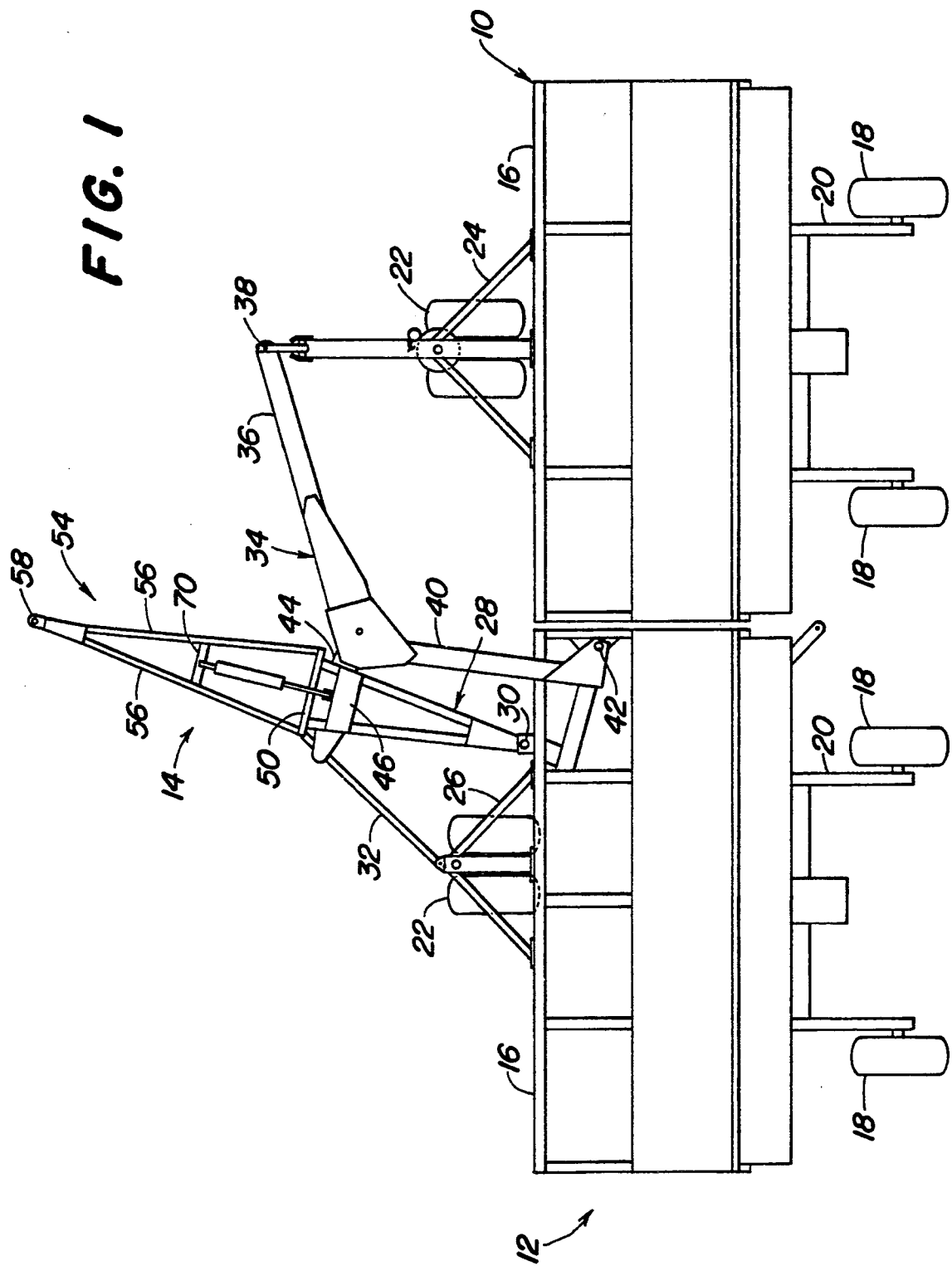
FIG. 1 is a top plan view of a pair of grain drills in operating position and connectable to a tractor by the improved weight transfer hitch system.

The invention is embodied in a pair of grain drills respectively identified in their entirety by the numerals 10 and 12 and shown in their operating position in FIG. 1, wherein they are disposed side by side and connected to a towing tractor by a hitch structure indicated in its entirety by the numeral 14.

As is well known, the towing tractor is provided with a conventional drawbar which is connected to the forward end of the hitch. When multiple grain drills are being towed by a single tractor, normally a larger size agricultural tractor is utilized. Such tractors are conventionally provided with hydraulic systems that include a hydraulic pump and an associated reservoir and at least two sets of hydraulic outlets at the rear of the tractor, with hydraulic control valves controlled by the tractor operator at the tractor operator's station for selectively connecting one of the outlets in each set to the hydraulic pressure source on the tractor while connecting the other outlet of each set to the reservoir. Most modern tractors sold in the U.S. in sizes normally used to pull multiple implements are provided with a closed center hydraulic system, and in many cases, more than two sets of hydraulic outlets are provided on the tractor, although only one set of hydraulic outlets are necessary to operate the weight transfer system according to the present invention.

Except for some small differences in the unit hitches of the respective grain drills 10 and 12, the grain drills are identical, and each drill includes a generally rigid frame 16 having its rearward end supported on a pair of ground engaging wheels 18 connected to the frame by trailing arms 20. The forward ends of the unit frames 16 are supported on a pair of caster wheels 22, the caster wheels on the right unit 10 being connected to a unit hitch 24, while the caster wheels 22 of the left hand unit 12 support a unit hitch 26 of the left grain drill 12. The unit hitches 24 and 26 are slightly different to accommodate the shifting of the right hand unit 10 to a trailing position to the left hand unit 12 for transport as described in greater detail in applicant's copending patent application Ser. No. 07/876,238 now U.S. Pat. No. 5,261,497. As is apparent from FIG. 1 the chief difference in the unit hitches reside in the fact that the unit hitch 24 has a somewhat longer tongue than the hitch 26.

The towing hitch 14 includes a generally triangular rear hitch member 28, as viewed in FIG. 1, with a rearward apex that is connected to the front of the frame 16 of the unit 12 by a vertical pivot 30. As apparent from FIG. 1, the pivot 30 is near the right side of the unit 12 and in operating position, as shown in FIG. 1, the hitch 14 is inclined slightly to the right so that the forward end of the hitch is directly forward of the center line between the two units. An angle brace 32 extends between the front end of the unit hitch 26 and the forward end of the rear hitch member 28.

The unit 10 is connected to the hitch 14 via a generally L-shaped swing hitch structure, indicated in its entirety by the numeral 34. The hitch structure 34 includes a hitch arm 36 having its outer end connected to the forward end of the unit hitch frame 24 by a vertical pivot 38. The swing hitch structure also includes a second arm 40, that is generally fore-and-aft in FIG. 1 and connected to the right end of the frame 16 of the unit 12 by a vertical pivot 42. A latch structure 44 connects the juncture of the arms 36 and 40 of the swing hitch structure to the forward end of the rear hitch member 28 as shown in FIG. 1.

As described in greater detail in the above described copending application, during transport of the machines the latch 44 is released and the swing hitch structure 34 swings around about the pivot 42 to position the right hand unit 10 directly behind the left hand unit 12. During transport, the towing hitch structure 14 is swung to the left about the pivot 30, so that the forward end of the hitch structure 14 is positioned on the center line of the unit 12.

As noted above, the rear hitch member 28 is generally triangular in shape and has a transverse member 46 adjacent its forward end. A pair of inclined arms 48 extend downwardly and slightly forwardly from the transverse member 46, and the lower ends of the arms 48 are connected by a lower transverse member 50. A generally transverse horizontal pivot 52 is supported on the forward end of the rear hitch member 28 immediately in front of the transverse member 50.

A generally triangular tongue structure 54 includes opposite horizontal side members 56 that converge to an apex at a drawbar connector 58 at the forward end of the hitch 14. As is well known, the drawbar connector 58 is connectable to a tractor drawbar by a vertical pivot that permits lateral swinging of the hitch relative to the drawbar while imposing a vertical load on the drawbar.

A double acting hydraulic cylinder 60 has its piston rod end 62 connected to the upper transverse member 46 of the rear hitch member 28 by a transverse pivot 64. The opposite or closed end 66 of the cylinder 60 is connected to the tongue 54 by a transverse pivot 68 that is supported on a cross member 70 extending between the opposite side members 56 of the tongue.

The pressure supplied to the cylinder 60 is controlled by an adjustable pressure control valve 72 that controls the amount of pressure of the hydraulic fluid supplied to the cylinder. Such control valves are well known in the art and are commercially available. The control valve 72 has a pressure inlet line 74 connected to a hydraulic coupler 76 that is connectable to one of the outlets in a set of hydraulic outlets on the tractor in the well known manner. Similarly, the valve 72 has a return line 78 with a coupler 80 that is connectable to the other outlet of the set of hydraulic outlets on the tractor. The valve 72 has a pressure outlet line connected to the chamber at the closed end of the cylinder 60, while the chamber at the piston rod end of the cylinder is connected to the line 78 by a hydraulic line 84. A hydraulic line 86 extends between the lines 82 and 84 and is provided with a check valve 88 that permits the flow of hydraulic fluid only from the line 84 to the line 82.

Figure 2:
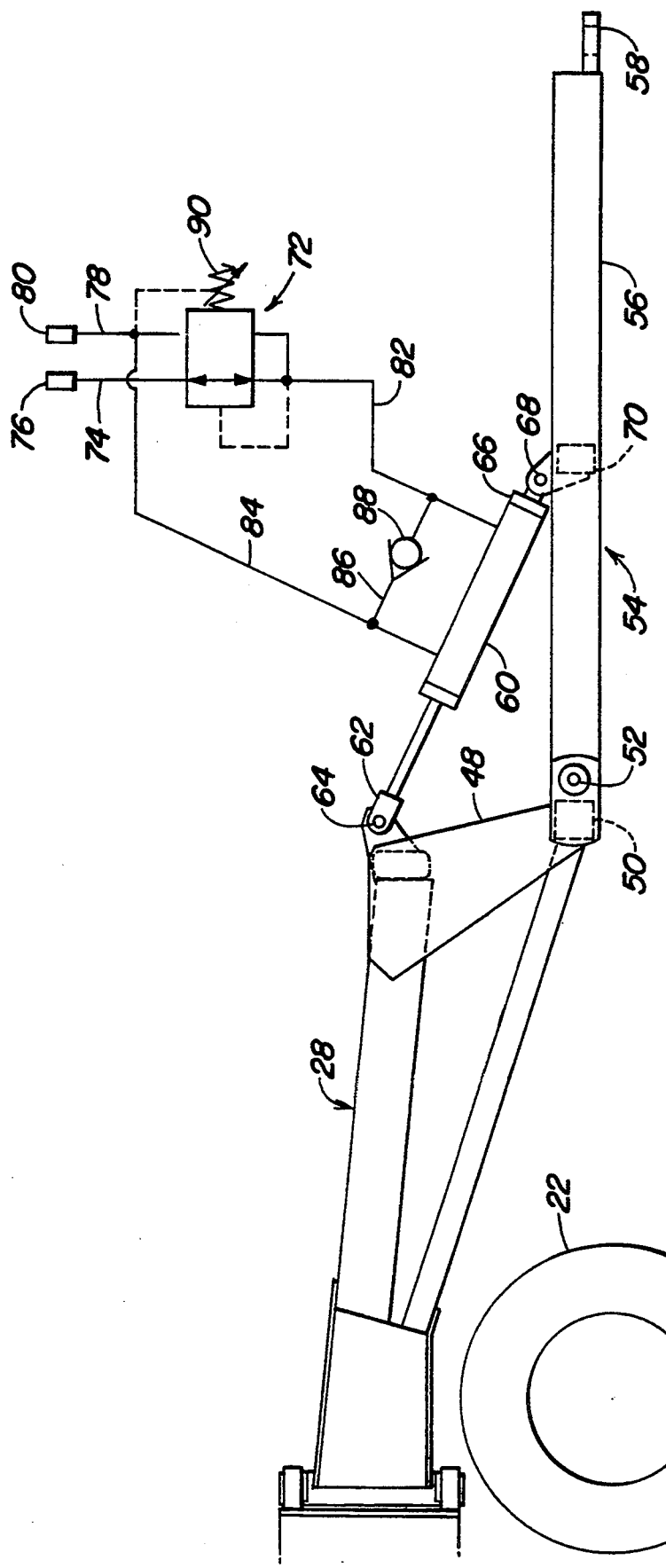
FIG. 2 is a side elevation view of the weight transfer hitch system schematically showing the hydraulic system for controlling the weight transfer hydraulic cylinder.

As is well known, the valve 72 is provided with a manually adjustable spring 90 that biases the valve toward the open position as shown in FIG. 2 wherein the valve connects the pressure inlet line 74 to the hydraulic line 82 to the closed end of the piston.

In operation, to actuate the weight transfer system, the operator shifts the control valve on the tractor to a position wherein it connects the tractor fluid pressure source to the outlet connected to the connector 76, while the corresponding connector 80 is connected to the return line or sump on the tractor. The pressurized fluid is then delivered to the valve 72 until the pressure in the line 82 reaches the point where the pressure overcomes the bias of the spring 90 and shifts the valve to a closed position (to the right in FIG. 2). Typically, a modern tractor closed center hydraulic system has a stand by pressure of approximately 2200 psi, and the spring 90 is adjusted so a substantially lesser pressure is delivered to the valve outlet line 82 and consequently the cylinder 60. As is apparent, pressure in the line 82 causes the cylinder 60 to extend exerting a force between the pivots 64 and 68 that corresponds to the pressure in the closed end of the cylinder. That pressure, of course exerts a downward pressure on the tongue 54, so that part of the weight of the implements is shifted onto the tractor drawbar. As is also apparent, by adjusting the spring 90, the operator can vary the force exerted by the cylinder 60 and consequently vary the amount of weight transferred to the tractor drawbar. The weight transferred to the tractor drawbar is weight removed from the caster wheels 22 and consequently the front end of the grain drill frames 16, thereby eliminating excessive loads on the grain drill frame. In addition, the added weight on the tractor drawbar can improve the traction of the tractor when operating in difficult traction conditions.

When the machines are being operated on uneven terrain, if the tractor drawbar raises relative to the grain drills to raise the front end of the tongue 54, the pressure on the line 82 would tend to increase beyond the pressure set by the adjustment of the spring 90, so that the valve will shift to dump oil from the line 82 to the line 78 until the desired or preselected pressure is reached. Conversely, if the forward end of the tongue is lowered, to decrease the pressure in the line 82, the valve would again shift to the position shown in FIG. 2 to increase the pressure in the line 82 to the preselected pressure. Of course, the above presupposes that the control valve on the tractor is set to connect the line 74 to the pressure source and the line 78 to the reservoir. If the control valve on the tractor is moved to a neutral condition to block the flow to and from the lines 74 and 78, if the front end of the tongue 54 were to be shifted downwardly due to uneven terrain, oil from the piston end of the cylinder 60 would be forced through the line 86 and the check valve 88 back to the closed end of the cylinder, thereby permitting flexing of the hitch even if the valve is in neutral condition. Conversely, if the front end of the tongue 54 were raised, which would tend to compress the cylinder 60, the pressure in the line 82 would increase so that oil would be dumped through the valve 72 back to the line 78 and then back through the line 84 to the other end of the cylinder 60.

We claim:

1. In an agricultural seeding machine having a plurality of seeding units with each unit having a frame and ground engaging wheel means mounted on the frame for supporting at least a portion of the weight of the seeding unit, an improved hitch mechanism for connecting the seeding units to the drawbar of a towing tractor having a source of hydraulic pressure, the hitch mechanism comprising:

a rear hitch member;

means connecting the rear hitch member to the frames of the respective seeding units;

a tongue having a forward end connectable to the tractor drawbar;

pivot means operatively connecting the rearward end of the tongue to the rear hitch member for vertical adjustment about a horizontal axis generally transverse to the direction of machine travel;

a hydraulic cylinder having one end connected to the tongue forwardly of the pivot means and its other end connected to the rear hitch member offset from the pivot means; and control means for connecting the source of fluid pressure to the cylinder whereby extension of the cylinder exerts a downward force on the tongue to increase the downward force on the tractor drawbar, so that a portion of the weight of the seeding unit is transferred from the seeding unit wheel means to the tractor drawbar, the control means including a pressure control valve means operative to supply fluid under pressure to the cylinder at a predetermined pressure less than the output pressure of the fluid pressure source.

2. The invention defined in claim 1 wherein the control valve means includes adjustment means for selectively adjusting the predetermined pressure supplied to the cylinder.

3. The invention defined in claim 1, wherein the cylinder includes a piston rod end connected to the rear hitch member and a closed end connected to the tongue and the control means includes a hydraulic line connecting the opposite ends of the cylinder and a check valve in the line permitting flow only from the piston rod end to the closed end.

4. In an agricultural seeding machine having a main frame at least partially supported on ground engaging wheels an improved weight transfer hitch mechanism for connecting the machine to the drawbar of a towing tractor having a pressurized hydraulic outlet selectively connected via a control valve on the tractor to a fluid pressure source and a return outlet connected by the control valve to a fluid pressure reservoir on the tractor, the hitch mechanism comprising:

a rear hitch member connected to the main frame;

a generally horizontal tongue having its forward end connected to the tractor drawbar;

a pivot means operatively connecting the rearward end of the tongue to the rear hitch member for vertical adjustment about a horizontal axis transverse to the direction of travel;

a two way hydraulic cylinder having one end connected to the rear hitch member offset from the pivot means and its other end connected to the tongue forwardly of the pivot means; and pressure control valve means connected to the tractor hydraulic outlets and the opposite ends of the cylinder for supplying fluid at a predetermined pressure less than the pressure at the pressurized tractor outlet to the closed end of the cylinder while connecting the other end of the cylinder to the return outlet connected to the reservoir, whereby the cylinder exerts a downward force on the tongue that is transferred to the tractor drawbar to support a preselected portion of the weight of the machine on the drawbar.

5. The invention defined in claim 4 wherein the control valve means includes adjustment means for selectively adjusting the predetermined pressure supplied to the cylinder.

6. The invention defined in claim 4 and including a hydraulic line connecting the normally pressurized end of the cylinder to the other end of the cylinder and a check valve in the line for permitting flow only from said other end to the normally pressurized end.

7. The invention defined in claim 6 wherein the piston rod end of the cylinder is connected to the rear hitch member and the closed end of the cylinder is connected to the tongue.

8. The invention defined in claim 7 wherein the piston rod end of the cylinder is connected to the rear hitch member generally above the pivot means.

* * * * *